United States Patent [19]
Hintze

[11] 3,852,976
[45] Dec. 10, 1974

[54] AIR CONDITIONING APPARATUS FOR AUTOMOTIVE VEHICLES OR THE LIKE

[76] Inventor: Rudolf Hintze, Lessingstrasse 32, Heusenstamm, Germany

[22] Filed: Nov. 16, 1972

[21] Appl. No.: 307,212

[30] Foreign Application Priority Data
Nov. 19, 1971 Germany............................ 2157380

[52] U.S. Cl. .............................................. 62/499
[51] Int. Cl. ............................................. F25b 3/00
[58] Field of Search ..................................... 62/499

[56] References Cited
UNITED STATES PATENTS
1,204,061 11/1916 Plekenpol............................ 62/499
2,979,921 4/1961 Sampietro............................ 62/499

Primary Examiner—Meyer Perlin
Attorney, Agent, or Firm—Michael S. Striker

[57] ABSTRACT

An air conditioning apparatus for use in automotive vehicles wherein the condenser and the compressor are assembled into a single aggregate which is rotatably mounted on a stationary crankshaft and is driven by the engine. The crankshaft has two axially parallel passages one of which supplies condensed cooling agent from the condenser to an evaporator mounted in or close to the passenger compartment, and the other of which returns vaporized cooling agent from the evaporator to the cylinder of the compressor. The latter is directly connected with the condenser and the condenser resembles a hollow wheel-shaped rotor surrounding the cylinder of the compressor and having ribs or fins in the form of vanes serving to draw air through the apertured end walls and to expel air through a cylindrical shell of a stationary casing for the condenser and compressor.

20 Claims, 3 Drawing Figures

AIR CONDITIONING APPARATUS FOR AUTOMOTIVE VEHICLES OR THE LIKE

BACKGROUND OF THE INVENTION

The present invention relates to air conditioning apparatus in general, and more particularly to improvements in air conditioning apparatus wherein a compressor compresses a cooling agent which is thereupon caused to pass into a condenser and thence into an evaporator prior to being returned into the compressor. Still more particularly, the invention relates to improvements in air conditioning apparatus which can be used for conditioning of air in passenger compartments and/or driver compartments of automotive vehicles.

In many presently known air conditioning apparatus for use in automotive vehicles, the compressor is driven by the engine of the vehicle and is remote from the condenser as well as from the evaporator. The condenser is normally installed in front of the radiator and must be connected with the remote compressor by means of flexible and/or rigid conduits. THe same applies for the connections between the condenser and the evaporator on the one hand, and the compressor and evaporator on the other hand. The evaporator is mounted in the passenger compartment and is connected with a conventional expansion valve which receives condensed cooling agent from the condenser.

A drawback of such conventional air conditioning apparatus is that they require a large number of relatively long conduits and a correspondingly large number of fluidtight connections to prevent escape of cooling agent. In addition, the spaced-apart main components of the apparatus occupy a large amount of space, mainly due to the fact that the condenser is mounted in front of the radiator in order to take advantage of the cooling section of ram air when the vehicle is in motion. Thus, the condenser is cooled by the fan of the radiator as well as by the air currents which develop as a result of movement of the vehicle.

It was already proposed to combine the compressor and both heat exchangers (i.e., the condenser and the evaporator) of an air conditioning apparatus into a single unit wherein the heat exchangers state with the compressor cylinder about a stationary crankshaft. Such proposal also exhibits a number of serious drawbacks. Thus, the unit occupies too much room and the output of the blower, which is rigidly connected with the evaporator, cannot be adjusted by a thermostat or other automatic regulating means so as to allow for changes in the cooling action of the apparatus.

SUMMARY OF THE INVENTION

An object of the invention is to provide a novel and improved air conditioning apparatus for use in automotive vehicles or the like.

Another object of the invention is to provide an air conditioning apparatus which is constructed and assembled in such a way that its component parts can be readily installed in spaces which are available in an automotive vehicle or the like and that its main components can be operatively connected to each other by a relatively small number of conduits and fluidtight connecting elements.

A further object of the invention is to provide a novel compressor device and a novel condenser device for use in the improved air conditioning apparatus.

An additional object of the invention is to provide novel and improved means for conveying a cooling agent between the evaporator, condenser device and compressor device for an air conditioning apparatus which is especially suited for use in automotive vehicles.

Still another object of the invention is to provide the air conditioning apparatus with a condenser unit which is highly effective in spite of the fact that it need not be mounted in front of the radiator in an automotive vehicle and that it need not be cooled by ram air.

A further object of the invention is to provide a novel and improved connection between the compressor and condenser devices in an apparatus for the conditioning of air in the passenger compartment or driver compartment of an automotive vehicle or the like.

The invention is embodied in an air conditioning apparatus which comprises a stationary support preferably including a crankshaft, a rotary compressor device for an evaporable cooling agent which is rotatably mounted on the support, drive means for rotating the compressor device, and a condenser device for compressed cooling agent. The crankshaft has a passage which receives cooling agent from the compressor device or from the condenser device for conveying the cooling agent to the expansion valve of an evaporator located in or close to the passenger or driver compartment in an automotive vehicle. The compressor unit comprises a cylinder and a bearing sleeve which is rigid with the cylinder and surrounds the crankshaft. The bearing sleeve has a passage which communicates with the passage of the crankshaft and receives agent either from the cylinder of the compressor device or from the condenser device. The passage of the bearing sleeve receives cooling agent directly from the cylinder of the compressor device if the latter rotates relative to the condenser device; the passage of the crankshaft then delivers cooling agent to the condenser device and the latter supplies condensed cooling agent to the evaporator which returns vaporized cooling agent to the compressor device. If the compressor device and the condenser deivce constitute an aggregate which rotates relative to the crankshaft, the compressor device supplies cooling agent directly to the condenser device and the latter supplies condensed cooling agent to the passage of the bearing sleeve for admission into the passage of the crankshaft. The return flow of vaporized cooling agent from the evaporator to the compressor device preferably takes place by way of further passage which is provided in the crankshaft and alternately communicates with two chambers of the rotating compressor cylinder. The cylinder contains a double-acting piston which reciprocates therein in response to rotation of the cylinder and its bearing sleeve relative to the crankshaft.

The novel features which are considered as characteristic of the invention are set forth in particular in the appended claims. The improved air conditioning apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
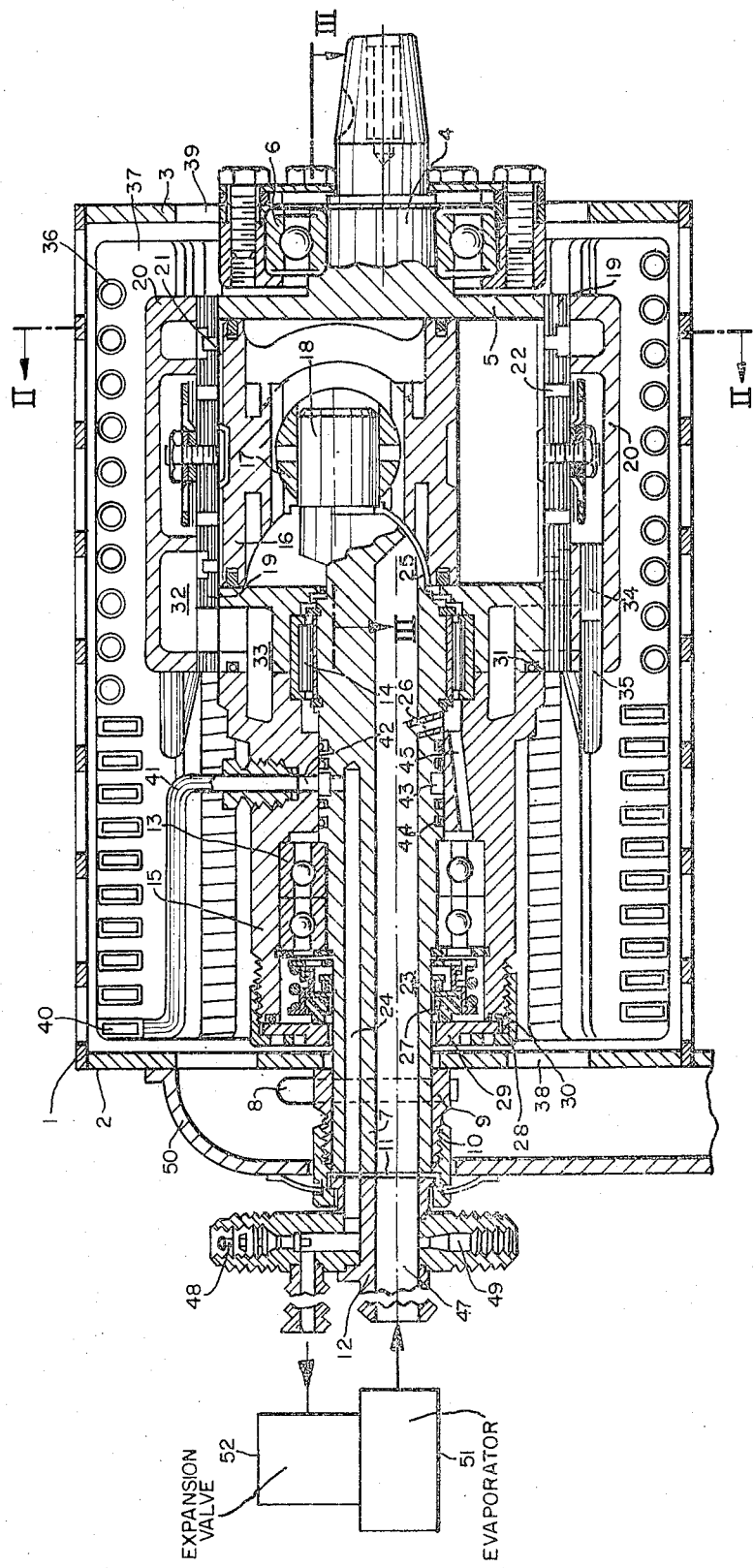
FIG. 1 is a longitudinal sectional view of an aggregate

Referring to the drawing, the compressor-condenser aggregate is rotatable in an enclosure or casing including an apertured cylindrical shell or mantle 1 and two apertured end walls 2, 3. The parts 1–3 of the casing may consist of sheet metal. The aggregate is rotated by the engine of a vehicle through the intermediary of a drive shaft 4 which is rotatable in an antifriction bearing 6 mounted in the end wall 3. The drive shaft 4 is rigid with and serves to rotate a compressor cylinder 5. A stationary support in the form of a crankshaft 7 is mounted in and is held against rotation by the end wall 2. To this end, the end wall 2 is rigidly connected with an outwardly extending sleeve 9 (e.g., by soldering), and the sleeve 9 is traversed by one or more pins 8 which also extend into traverse peripheral cutouts or flutes of the crankshaft 7. A portion of the sleeve 9 is externally threaded to take a nut 10 which presses a sealing ring 11 against the left-hand end face of the crankshaft 7, as viewed in FIG. 1. At the same time, the nut 10 urges a flange on the body 12 of a system of valves 48, 49 against the sealing ring 11.

The crankshaft 7 is surrounded by axially spaced anti-friction bearings 13 and 14 for a bearing sleeve 15 of the compressor cylinder 5. The sleeve 15 is threadedly connected to and rotates with the cylinder 5. The latter rotates a double-acting piston 16 which is received in its interior and simultaneously rotates about a crank pin 18 of the crankshaft 7. A spherical bearing member 17 is interposed between the crank pin 18 and the piston 16. The axis of the crank pin 18 is offset relative to the axis of the cylinder 5 so that the piston 16 completes two strokes in response to each revolution of the cylinder. The two ends or heads of the cylinder 5 are sealingly connected with valve plates 19 and valve covers 20 which are provided with pressure-responsive valves 21 and 22.

The crankshaft 7 is formed with a first axially parallel bore or passage 23 which supplies vaporized cooling agent from an evaporator 51 to the compressor, and with a second axially parallel bore or passage 24 which receives from the condenser compressed cooling agent or condensate to be fed into the evaporator 51. The bore 23 has an outlet 25 which communicates alternately with the two chambers of the cylinder 5. Such chambers are adjacent to the two axial ends of the piston 16. A lubricant intercepting tube 26 is mounted in the crankshaft 7 so that its inner end extends into the lower portion of the bore 23 to intercept some of the lubricant flowing toward the outlet 25 and to feed the thus intercepted lubricant to the antifriction bearings 13, 14. The intercepted lubricant is further supplied to the packing 27 of a stuffing box which is mounted on the crankshaft 7 between the stationary inner races of the twin antifriction bearing 13 and the end wall 2. A nut 28 which meshes with the rotating sleeve 15 bears against an O-ring 30 and rotates a gland 29 which is pressed against the packing 27. A further O-ring 31 is interposed between the cylinder 5 and the bearing sleeve 15. The outer race of the antifriction bearing 14 serves to center the parts 5 and 15.

The valve covers 20 are provided with channels 32 leading to suction valves for cooling agent. The channels 32 of the covers 20 communicate with each other and with the chambers of the cylinder 5 by way of bores provided in the valve plates 19 and by way of an annular channel 33 in the sleeve 15 and cylinder 5. Thus, the channels 32 are in communication with the outlet 25 of the bore 23 in the crankshaft 7 to deliver heated cooling agent to that chamber of the cylinder 5 whose volume increases while the piston 16 expels compressed cooling agent from the other chamber by way of the valve 21 or 22. The valve covers 20 are further provided with passages 34 which are connected with the piping or coil 36 of the condenser by means of conduits 35. The condenser coil 36 is reinforced and held together by ribs or fins 37 to form therewith a hollow wheel-shaped blower or rotor serving to draw into its interior cooling air through apertures 38 and 39 respectively provided in the end walls 2 and 3 and to expel heated air by way of apertures in the shell 1.

The condensate which leaves the condenser at 40 is fed into a circumferential groove 43 of the stationary crankshaft 7 by way of conduit 41 and a radial passage or bore 42 of the bearing sleeve 15. Such condensate is admitted into the second axially parallel passage or bore 24 of the crankshaft 7 to be supplied into the evaporator 51 by way of an expansion valve 52. In order to prevent an equalization of pressures between the bore 24 of the crankshaft 7 and the interior of the sleeve 15, the bore 42 of the sleeve 15 is flanked by pairs of sealing rings 44 which are received in circumferential grooves of the crankshaft 7. The inclined bores 45 in the rotating sleeve 15 serve to convey lubricant by centrifugal force from the outer end of the intercepting pipe 26 to the antifriction bearings 13, 14 and to insure equalization of pressures in these bearings. The lubricant is admixed to the cooling agent in a predetermined ratio in a manner similar to that known from two stroke cycle internal combustion engines.

The body 12 of the valve system is provided with bores 46, 47 which respectively communicate with the passage or bores 24 and 23 of the crankshaft 7. The valve body 12 is connected by rigid or flexible conduits with the commercially available evaporator 51 which is mounted in or near to the passenger compartment of an automotive vehicle. The body 12 of the valve system is respectively provided with evacuating and filling valves 48, 49 for the cooling agent.

An air duct 50 serves to supply atmospheric air at normal temperature in the event that the aggregate is mounted in a part of the vehicle wherein the temperature is higher than normal, for example, behind the radiator or close to the engine. This duct 50 is shown as being connected to the end wall 2 so as to supply unheated air to the apertures 38.

The improved aggregate is susceptible of many modifications without departing from the spirit of the invention. For example, the compressor cylinder 5 can rotate on the stationary crankshaft 7 to drive the piston 16 therein so that the latter compresses the cooling agent, and the compressed cooling agent can be supplied to a condenser which rotates with the cylinder 5 (as shown in the drawing) so that the condensate can be fed into the evaporator by way of the crankshaft 7, or the rotary condenser can be replaced by a stationary condenser which receives compressed cooling agent by way of the passage 24 in the stationary crankshaft 7. In the latter instance, the condenser can constitute a casing or enclosure for the rotating compressor. In each embodiment of the invention, the crankshaft 7 serves to convey cooling agent from the compressor to the evaporator 51 whereby the condenser can be mounted between the crankshaft 7 and the cylinder 5 of the compressor or between the crankshaft 7 and the evaporator 51, depending upon whether the condenser is stationary or rotates with or in response to rotation of the compressor. Thus, the crankshaft 7 can be used to convey a cooling agent which has undergone compression and condensation, or a cooling agent which is compressed and is to undergo condensation on its way from the crankshaft to the evaporator.

The compactness of the aggregate is enhanced due to the fact that the compressor employs a single cylinder 5 for the double-acting piston 16. This reduces the diameter of the aggregate and renders it possible to construct the compressor in the form of a device which is symmetrical with respect to its axis of rotation. The two mirror symmetrical valve covers 20 are placed at the same distance from the axis of the crankshaft 7 and can have identical weights. The piston 16 also includes two mirror symmetrical halves, and the same applies for its bearing member 17. The condenser 36, 37 is a body of rotation which shares all angular movements of the compressor cylinder 5 and receives compressed cooling agent from the pressure sides of both cylinder heads to supply liquefied cooling agent to the passage or bore 24 of the crankshaft 7 by way of the bearing sleeve 15 for the cylinder 5. Vaporized agent is returned from the evaporator 51 to the compressor cylinder 5 by way of the passage or bore 23.

The casing 1-3 supplies air which cools the condenser and constitutes a convenient enclosure which facilitates the mounting of the aggregate in an automotive vehicle. Furthermore, the casing 1-3 serves as a support for the crankshaft 7 and as means for journalling the engine-driven shaft 4 for the compressor cylinder 5.

Figure 2:
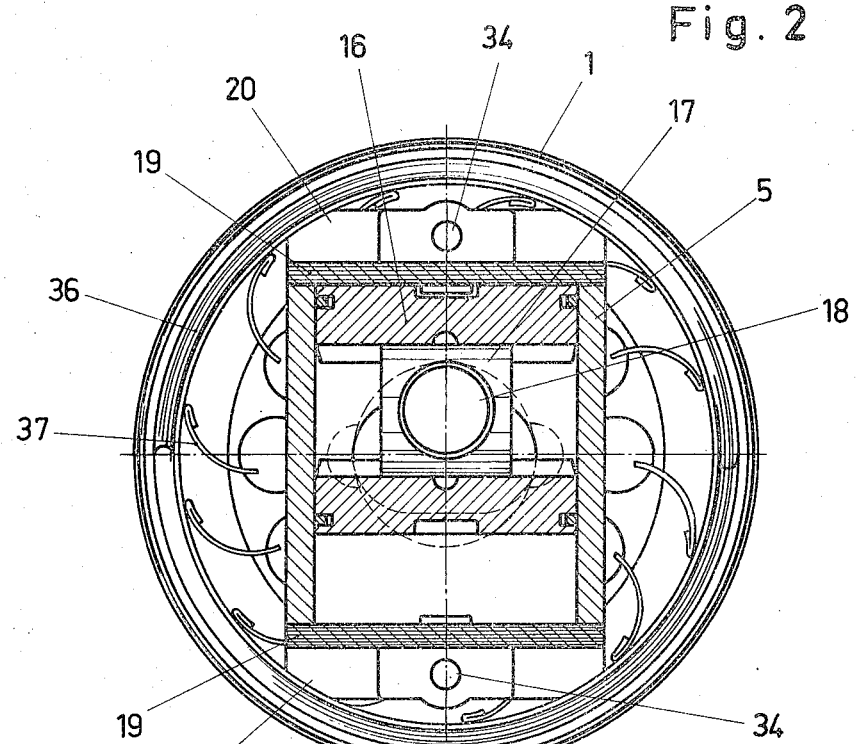
FIG. 2 is a transverse sectional view as seen in the direction of arrows from the line II—II of FIG. 1.
Figure 3:
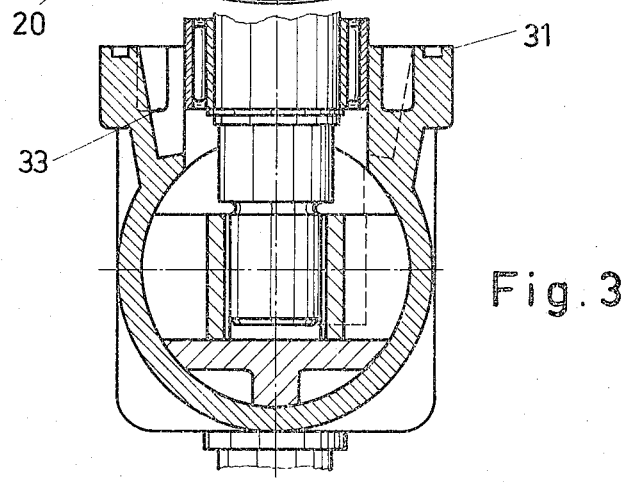
FIG. 3 is a sectional view as seen in the direction of arrows from the line III—III of FIG. 1.

An important advantage of the aggregate which is shown in FIGS. 1 to 3 is that the compressor cylinder 5 is directly connected with the condenser 36, 37 so that the condenser is cooled in automatic response to its rotation with respect to the stationary crankshaft 7. Consequently, the efficiency of the condenser is not affected by the fact that it is not mounted in the path of head wind and/or that it is not cooled by the fan of the radiator in an automotive vehicle. This enables a designer to mount the aggregate including the compressor and the condenser at any desired point, as long as the compressor receives torque from the engine. The conduits which connect the condenser with the remote compressor of a conventional air conditioning apparatus can be dispensed with, and the likelihood of leakage of cooling agent between the compressor and condenser is reduced accordingly. The improved aggregate further obviates the need for a discrete fan, other than the fan of the radiator, which is employed in conventional air conditioning apparatus wherein the condenser is not installed in front of the radiator.

The improved aggregate also exhibits a number of important advantages over those heretofore known air conditioning apparatus wherein the compressor rotates with the condenser as well as with the evaporator. First of all, the aggregate occupies less room than a unit which embodies the compressor and both heat exchangers (i.e., the evaporator and the condenser). Secondly, the evaporator (which need not rotate with the compressor and/or condenser) can be cooled by a thermostatically controlled multi-stage fan and can be installed in or close to the passenger compartment so as to insure proper conditioning of the passenger compartment to a desired extent. The space for the evaporator can be chosen independently of the location of the aggregate which allows for better utilization of available space than if the evaporator were to form part of a single unit which further includes the condenser and the compressor. By placing the evaporator close or relatively close to the aggregate, or vice versa, one can reduce the number and the overall length of heat-insulating conduits (and the number of fluidtight couplings) in the region of the engine to a minimum with attendant savings in initial and maintenance cost.

The advantages of the air conditioning apparatus which embodies the improved aggregate can be summarized as follows:

The compressor including the cylinder 5 and piston 16 does not occupy more room than a standard compressor, even when taken together with the hollow wheel-shaped condenser 36, 37. The compressor and the condenser can be installed or removed as a unit, and the rotating condenser produces a self-cooling action which is just as satisfactory as that of a radiator fan (with or without assistance from head wind) or a discrete fan. The more pronounced compressing action of the cylinder 5 and piston 16 in response to increasing RPM of the engine automatically entails a more pronounced cooling of the condenser because the latter's speed is proportional to that of the compressor. The three-dinmensional annular condenser which is located in the space surrounding the cylinder of the compressor occupies only about one-third of the front space which would be taken up by a flat condenser whose height equals the axial length and whose width equals the circumference of the annular condenser. In addition, the coefficient of thermal conduction of the rotating annular condenser is twice as high as that of a stationary condenser so that the rotating condenser insures a highly effective exchange of heat between the moving air and the confined cooling agent.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In an air conditioning apparatus, particularly for passenger and/or driver compartments of automotive vehicles, in combination, a unit comprising a rotary compressor device for an evaporable cooling agent, including a cylinder and a double-acting piston reciprocably received in said cylinder; a stationary support mounting said cylinder and piston for rotation and including a crankshaft having a crank pin which is arranged to reciprocate said piston in response to rotation of said cylinder; drive means for rotating said cylinder; a condenser device for compressed cooling agent and arranged to rotate with said compressor device, said support having a passage receiving cooling agent from said condenser device; and an evaporator located exteriorly of and separate from said unit, said evaporator communicating with said passage for receiving said cooling agent from the same.

2. A combination as defined in claim 1, wherein said compressor device further includes a rotary bearing sleeve surrounding said crankshaft, said passage being provided in said crankshaft and having an inlet communicating with a second passage provided in said bearing sleeve.

3. A combination as defined in claim 1, wherein cylinder is a single cylinder having two halves which are mirror symmetrical to a plane including the axis of said crankshaft, said compressor device further comprising a bearing sleeve rigid with said cylinder and rotatably surrounding said crankshaft, said sleeve having a second passage communicating with the passage of said support and arranged to receive cooling agent from said condenser device.

4. A combination as defined in claim 1, further comprising a second passage in said support arranged to convey into said compressor device vaporized cooling agent furnished by said evaporator.

5. A combination as defined in claim 4, further comprising expansion valve means for admitting into said evaporator cooling agent which is furnished by said first mentioned passage, said compressor device having means for drawing vaporized cooling agent from said second passage.

6. A combination as defined in claim 5, wherein said passages are axially parallel bores provided in said crankshaft.

7. A combination as defined in claim 4, said cooling agent containing an effective amount of lubricant, and further comprising means for intercepting some lubricant in said second passage of said support.

8. A combination as defined in claim 1, wherein said condenser device includes means for cooling the cooling agent furnished by said compressor device, said means for cooling including piping surrounding said compressor device and fins connected with said piping to form therewith a hollow wheel-shaped rotor.

9. A combination as defined in claim 8, further comprising a stationary apertured casing surrounding said rotor.

10. A combination as defined in claim 1, and further comprising a casing surrounding said compressor device and means for connecting said casing to said crankshaft.

11. In an air conditioning apparatus, particularly for passenger and/or driver compartments of automotive vehicles, a combination comprising a rotary compressor device for an evaporable cooling agent; a stationary support for said compressor device including a first passage, and a second passage having an upper portion and a lower portion; drive means for rotating said compressor device; a condenser device for compressed cooling agent which latter contains an effective amount of lubricant and is supplied to said first passage; an evaporator arranged to receive and vaporize cooling agent from said first passage, and to supply vaporized cooling agent to said second passage for conveyance to said compressor device; intercepting means, comprising a pipe mounted in said crankshaft and having an inlet extending into the lower portion of said passage for intercepting some of said lubricant; and antifriction bearing means arranged to receive lubricant from said pipe and being interposed between said compressor device and said crankshaft.

12. A combination as defined in claim 1, further comprising a stationary casing for said compressor device and a stuffing box arranged to receive lubricant from said pipe and mounted in said casing between said compressor device and said crankshaft.

13. In an air conditioning apparatus, particularly for passenger and/or driver compartments of automotive vehicles, a combination comprising a rotary compressor device for an evaporable cooling agent; a stationary support for said compressor device including a first passage, and a second passage having an upper portion and a lower portion; drive means for rotating said compressor device; a condenser device for compressed cooling agent, said condenser device being connected for rotation with said compressor device and including means for cooling the cooling agent furnished by said compressor, said means for cooling including piping surrounding said compressor device and fins connected with said piping to form therewith a hollow wheel-shaped rotor; and a stationary casing surrounding said rotor and including two apertured end walls and an apertured tubular shell between said end walls, said rotor being arranged to draw air through said end walls and expel air through said shell.

14. A combination as defined in claim 13, wherein said casing is arranged to take up torque which is produced in response to compression of cooling agent in said compressor device.

15. A combination as defined in claim 13, further comprising duct means for supplying unheated atmospheric air to the apertures of at least one of said end walls.

16. A combination as defined in claim 13, wherein said compressor device comprises a cylinder and further comprising antifriction bearing means interposed between one of said end walls and said cylinder.

17. In an air conditioning apparatus, particularly for passenger and/or driver compartments of automotive vehicles, a combination comprising a rotary compressor device for an evaporable cooling agent; a stationary support for said compressor device, said support including a crankshaft; drive means for rotating said compressor device; a condenser device for compressed cooling agent, said support having a passage receiving cooling agent from one of said devices; a casing surrounding said compressor device and including two end walls and a tubular shell disposed between said end walls, one of said end walls surrounding said crankshaft; and connecting means for connecting said casing to said crankshaft, said connecting means including a sleeve secured to said one end wall and at least one pin extending transversely into said sleeve and received in a notch provided in the periphery of said crankshaft.

18. A combination as defined in claim 17, further comprising a valve body adjacent to said crankshaft, a nut meshing with said sleeve to secure said body to said crankshaft, and sealing means interposed between said body and said crankshaft.

19. In an air conditioning apparatus, particularly for passenger and/or driver compartments of automotive vehicles, a combination comprising a rotary compressor device for an evaporable cooling agent, including a cylinder and a double-acting piston reciprocably received in said cylinder, and a rotary bearing sleeve provided with a first passage; a stationary support surrounded by said bearing sleeve and mounting said cylinder and piston for rotation, including a crankshaft having a crank pin which is arranged to reciprocate said piston in response to rotation of said cylinder; drive means for rotating said cylinder; a condenser device for compressed cooling agent, said support having a second passage communicating with a discharge end of said first passage; and sealing means interposed between said support and said sleeve at the opposite sides of said discharge end.

20. In an air conditioning apparatus, particularly for passenger and/or driver compartments of automotive vehicles, a combination comprising a rotary compressor device for an evaporable cooling agent, including a cylinder and a double-acting piston reciprocably received in said cylinder and a bearing sleeve connected for rotation with said cylinder; a stationary support surrounded by said bearing sleeve and mounting said cylinder and piston for rotation and including a crankshaft having a crank pin which is arranged to reciprocate said piston in response to rotation of said cylinder; drive means for rotating said cylinder; a condenser device for compressed cooling agent, said support having a passage receiving cooling agent from one of said devices; sealing means interposed between said sleeve and said cylinder; and antifriction bearing means interposed between said support and said compressor device, said bearing means having an outer race arranged to center said compressor device on said support.

* * * * *